(12) United States Patent
Liao

(10) Patent No.: US 12,741,325 B2
(45) Date of Patent: Sep. 22, 2026

(54) EXTERNAL AND INTERNAL CHAMFER TOOL

(71) Applicant: Eric Liao, Taichung (TW)

(72) Inventor: Eric Liao, Taichung (TW)

( * ) Notice: Subject to any disclaimer, the term of this patent is extended or adjusted under 35 U.S.C. 154(b) by 611 days.

(21) Appl. No.: 18/350,457

(22) Filed: Jul. 11, 2023

(65) Prior Publication Data

US 2024/0066612 A1 Feb. 29, 2024

(30) Foreign Application Priority Data

Aug. 31, 2022 (TW) ................................ 111132994

(51) Int. Cl.
*B23C 3/12* (2006.01)
*B23C 5/22* (2006.01)

(52) U.S. Cl.
CPC ............ *B23C 3/124* (2013.01); *B23C 5/2295* (2013.01); *B23C 2210/168* (2013.01); *B23C 2220/16* (2013.01); *B23C 2240/32* (2013.01)

(58) Field of Classification Search
CPC . B23C 3/124; B23C 5/2295; B23C 2210/168; B23C 2220/16; B23C 2240/32; B23B 2265/08; B23B 2270/205; B23B 5/167; B23G 9/003
See application file for complete search history.

(56) References Cited

U.S. PATENT DOCUMENTS 1,662,936 A * 3/1928 Philipp .................. B23B 5/167 81/3.4
3,232,145 A * 2/1966 Wilson ................... B23B 5/167 408/202

FOREIGN PATENT DOCUMENTS

DE 202009002719 U1 * 4/2009 ............ B23B 5/167

OTHER PUBLICATIONS

Brinko; DE-202009002719-U1; Machine translation (Year: 2009).*

* cited by examiner

*Primary Examiner* — Lee A Holly
(74) *Attorney, Agent, or Firm* — Sinorica International Patent & Trademark

(57) ABSTRACT

A chamfer tool includes a main body, a driving shaft and a plurality of milling members. The main body, which rotates along an axis, has an inner surface and an outer surface located on opposite sides thereof; wherein the main body further has a plurality of mounting portions, each of which is connected to the inner surface and outer surface. The driving shaft is fixed to the main body to drive the main body to rotate. Each of the milling members has a first blade and a second blade, wherein the milling members are mounted on the mounting portions of the main body with the first blades protruding from the outer surface of the main body and the second blades protruding from the inner surface of the main body.

8 Claims, 8 Drawing Sheets

EXTERNAL AND INTERNAL CHAMFER TOOL

BACKGROUND OF THE INVENTION

1. Technical Field

The present invention relates to chamfer tool, and more particularly to an external and internal chamfer tool with a convenient operation and high chip removal efficiency.

2. Description of Related Art

After cutting, tubes or screws often have irregular burrs or beveled edges at their ends. In addition, long-term use can cause rust or create notches at the port area, preventing secure connections with other components. To address this issue, practitioners would use sandpaper or files to repeatedly grind the ends of the tubes or screws to remove the burrs. However, this method is inefficient and often results in uneven surfaces. In recent years, a chamfering tool were developed that can be connected to a driving tool (such as an electric or pneumatic tool) on one end and equipped with a blade on the other end. By rapidly rotating, this tool can efficiently remove the burrs and irregular beveled edges on tubes, creating smooth and uniform chamfers at the ports.

Generally speaking, conventional chamfer tools presented in the market can only perform chamfering operations on either the inner end or the outer end of a tube. Therefore, workers typically need to prepare at least two types of chamfer tool in order to meet both internal and external chamfering requirements, which is highly inconvenient. Additionally, the chips produced during chamfering operations are prone to accumulating, which may lead to tool wear and reduce the lifespan of the tool over time. Therefore, enhancing the convenience of chamfering operations and improving chip removal efficiency are urgent issues to be addressed in the relevant technical field.

BRIEF SUMMARY OF THE INVENTION

In view of the above, the primary objective of the present invention is to provide an external and internal chamfer tool, which improves the convenience and chip removal efficiency of chamfering operations.

In order to achieve the objective of the present invention, a chamfer tool includes a main body, a driving shaft and a plurality of milling members. The main body, which rotates along an axis, has an inner surface and an outer surface located on opposite sides thereof; wherein the main body further has a plurality of mounting portions, each of which is connected to the inner surface and outer surface. The driving shaft is fixed to the main body to drive the main body to rotate. Each of the milling members has a first blade and a second blade, wherein the milling members are mounted on the mounting portions of the main body with the first blades protruding from the outer surface of the main body and the second blades protruding from the inner surface of the main body.

In an embodiment, the main body has a plurality of edge portions adjacent to ends of the mounting portions individually; each of the milling members has a first connecting groove corresponding to the edge portions respectively, and each of the first connecting groove further has a notch on a sidewall thereof; the edge portions enter the notches along the first connecting grooves without contacting the inner surfaces of the notches when the milling members is mounted on the mounting portions.

In an embodiment, further comprising a fixing member detachably connected to the main body and resting against at least one of the milling members to secure the milling members to the main body.

In an embodiment, each of the milling members has a peak and a second connecting groove adjacent to the peak, allowing an end of the fixing member resting against the second connecting grooves of the milling member and surrounding the peaks when the fixing member is secured to the main body.

In an embodiment, further comprising a shaft fixing member mounted on the main body, wherein the shaft fixing member having a non-circular shaft hole for the driving shaft to pass through; a shape of the shaft hole corresponds to that of the driving shaft to prevent the driving shaft from rotating relative to the shaft fixing member.

In an embodiment, a plurality of chip removal surfaces are formed between each of the neighboring mounting portions respectively, and at least two of the chip removal surfaces are non-coplanar.

In an embodiment, A chamfer tool comprises a main body, which rotates along an axis; having mounting portions, and wherein a chip removal surface is formed between two of the neighboring mounting portions; a driving shaft fixed to the main body to drive the main body to rotate; and a plurality of milling members mounted on the mounting portions of the main body, wherein each of the milling members has an end protruding from the main body; wherein the chip removal surface is inclined from one of the mounting portions towards the other.

In an embodiment, the main body has a plurality of edge portions adjacent to ends of the mounting portions individually; each of the milling members has a first connecting groove in an end corresponding to the edge portions respectively, and each of the first connecting groove further has a notch; the edge portions enter the notches along the first connecting grooves without contacting the inner surfaces of the notches when the milling members is mounted on the mounting portions.

In an embodiment, further comprising a fixing member detachably connected to the main body, wherein each of the milling members has a peak and a second connecting groove adjacent to the peak; thereby when the fixing member is secured to the main body, ends of the fixing members rest against the corresponding second connecting grooves of the milling members and surround the peaks to secure the milling members to the main body.

In an embodiment, further comprising a shaft fixing member mounted on the main body, wherein the shaft fixing member has a non-circular shaft hole for the driving shaft to pass through; a shape of the shaft hole corresponds to that of the driving shaft to prevent the driving shaft from rotating relative to the shaft fixing member.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
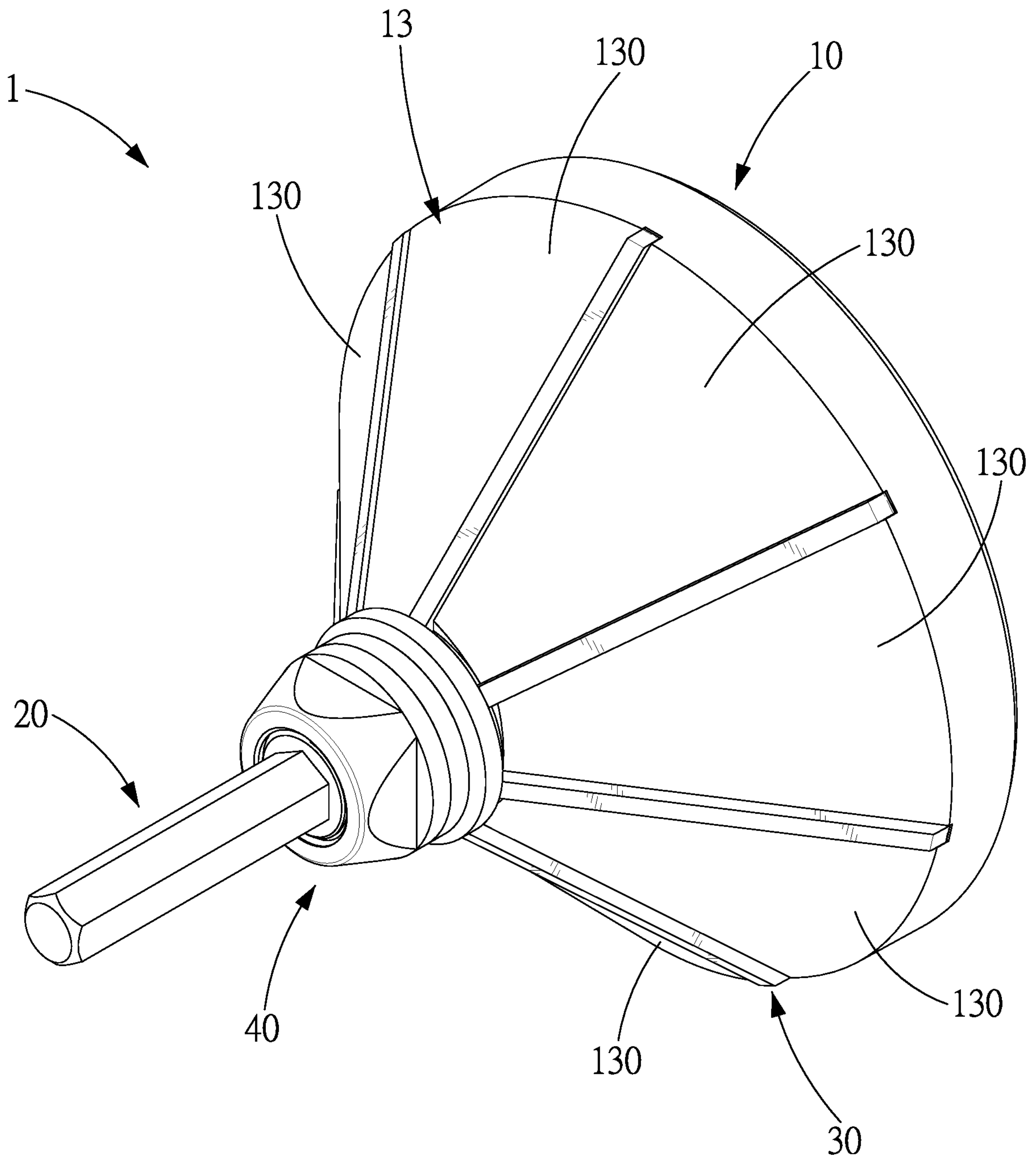
FIG. 1 is a perspective view of a preferred embodiment of the present invention.
Figure 2:
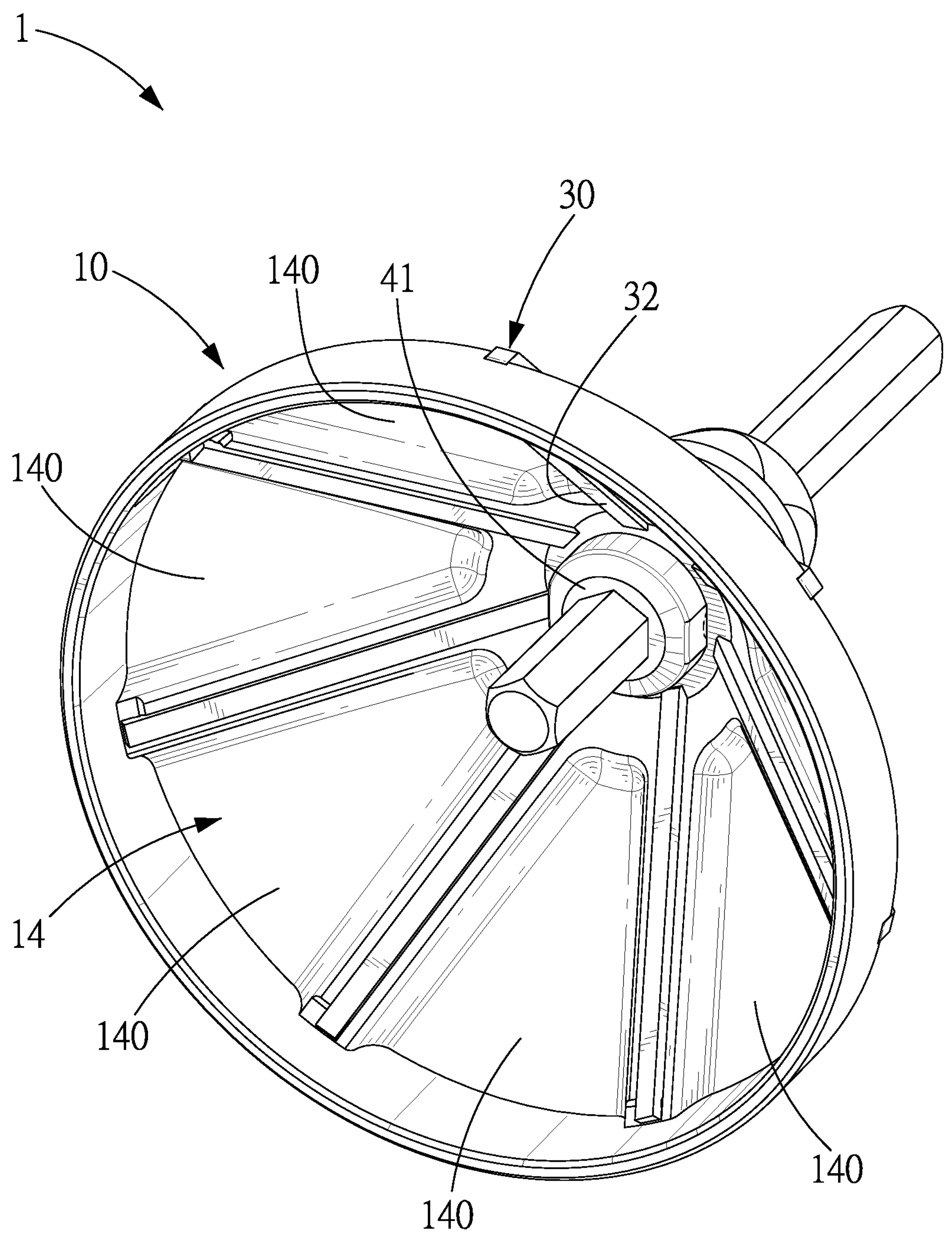
FIG. 2 is another perspective view of the preferred embodiment of the present invention.
Figure 3:
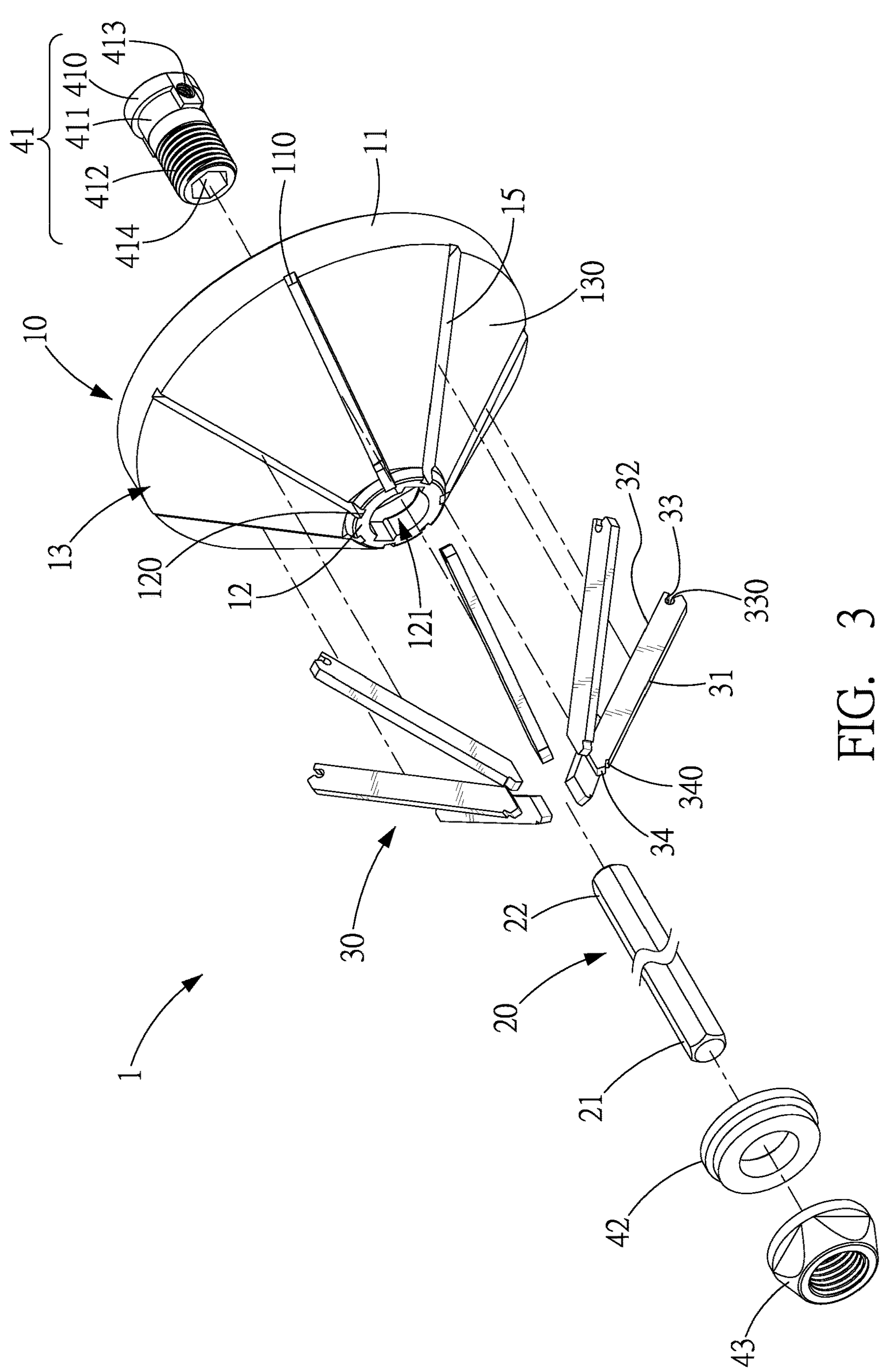
FIG. 3 is an exploded view of the preferred embodiment of the present invention.
Figure 4:
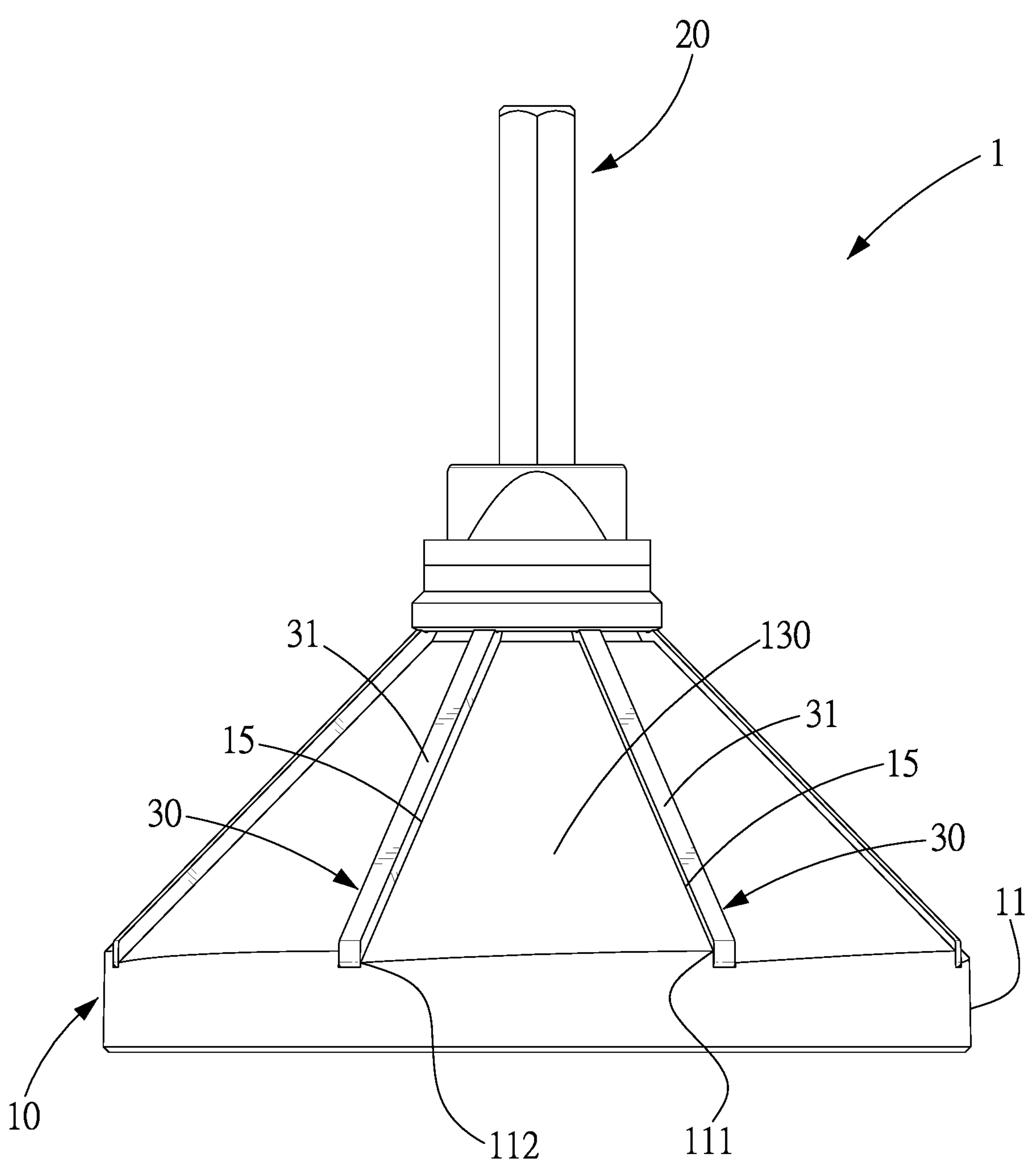
FIG. 4 is a side view of the preferred embodiment of the present invention.
Figure 5:
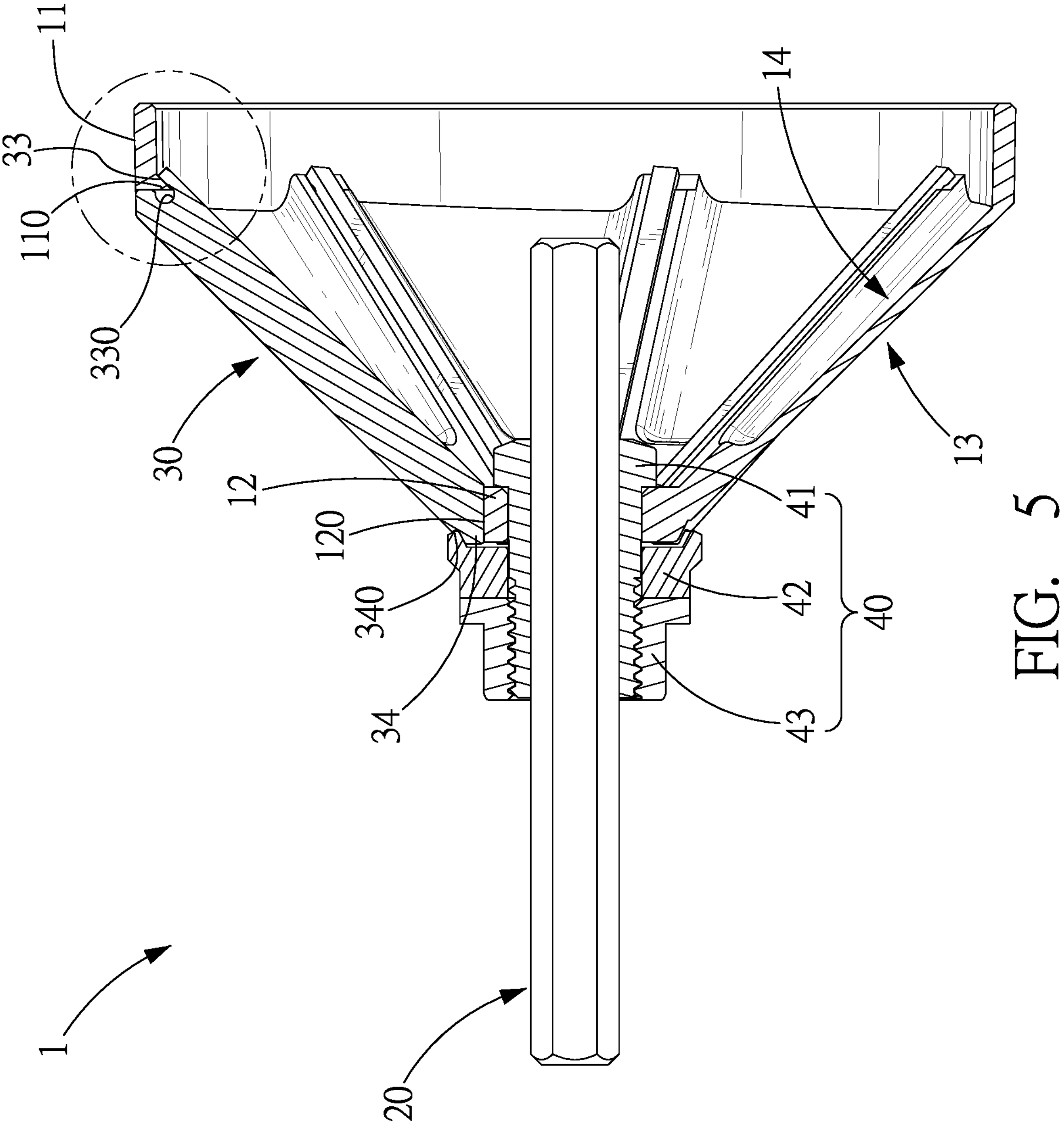
FIG. 5 is a sectional view of the preferred embodiment of the present invention.
Figure 6:
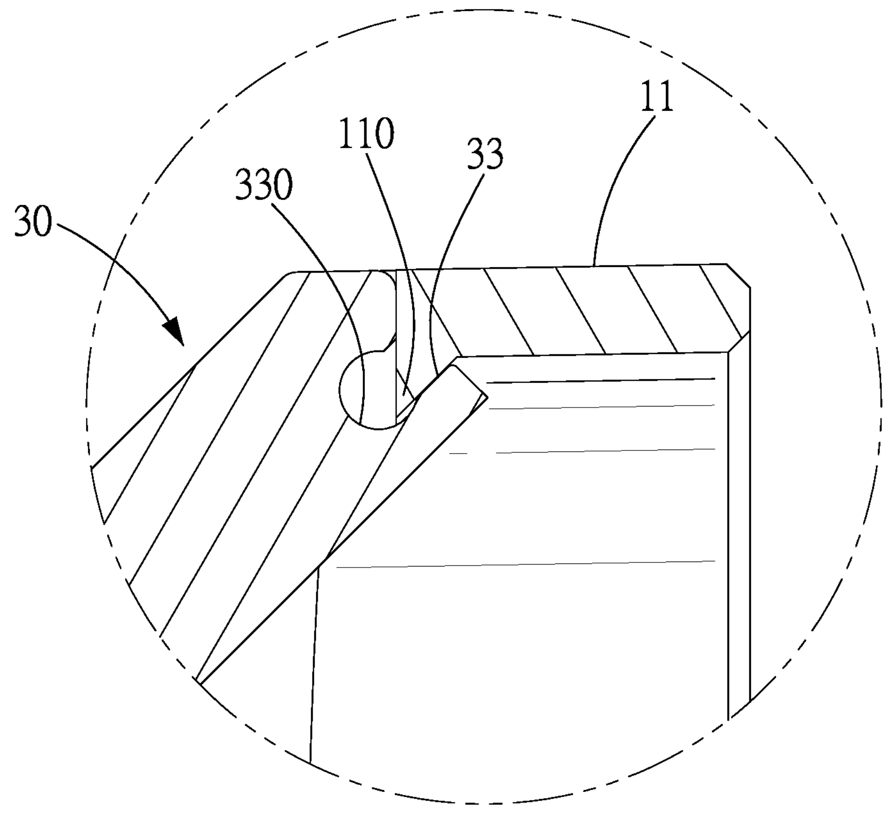
FIG. 6 is a partial enlargement view of FIG. 5.

As shown in FIG. 1 to FIG. 6, a chamfer tool 1 of the preferred embodiment of the present invention includes a main body 10, a driving shaft 20, a plurality of milling members 30, and a fixing assembly 40.

The main body 10 is a cone-like member, having a first ring portion 11, a second ring portion 12, an outer surface 13, an inner surface 14 and a plurality of mounting portions. The first ring portion 11 and the second ring portion 12 are located on opposite ends of the main body 10 in an axial direction, and kept a predetermined distance away from each other. The external diameter of the first ring portion 11 are greater than that of the second ring portion 12, and the external diameter of the main body 10 gradually decreases in the direction from the first ring portion 11 towards the second ring portion 12. The first ring portion 11 has a plurality of edge portions 110 located in an end of each mounting portion individually and communicated with the corresponding mounting portions. The second ring portion 12 has a plurality of recesses 120 located in an end of each mounting portion opposite to the edge portions 110 and communicated with the corresponding mounting portions. The second ring portion 12 further includes a non-circular embedded hole 121 which passes through an axial interior of the second ring portion 12. In the present preferred embodiment, the embedded hole 121 is a round hole with two rectangular slots on a sidewall thereof. The outer surface 13 and the inner surface 14 are located on opposite sides of the main body 10 and between the first ring portion 11 and the second ring portion 12. In particular, the outer surface 13 is a tapered peripheral surface on an outer side of the main body 10, and the inner surface 13 is a tapered peripheral surface on an inner side of the main body 10. The mounting portions are arranged radially around the main body 10 from the second ring portion 12 to the first ring portion 11. In the present preferred embodiment, each of the mounting portions has a slot 15 with both ends connected to the first ring portion 11 and the second ring portion 12. Opposite ends of the slot 15 are communicated with the edge portion 110 of the first ring portion 11 and the recess 120 of the second ring portion 12 respectively. The slots 15 separate the outer surface 13 into a plurality of outer chip removal surface 130, thereby each of the outer chip removal surfaces 130 is between each pair of the neighboring slots 15; in other words, each of the slots 15 is between each pair of the neighboring outer chip removal surfaces 130. Wherein, at least two of the outer chip removal surfaces 130 are non-coplanar. Each outer chip removal surface 130 has a first connecting end 111 and a second connecting end 112 at opposite sides connected to the slots 15. Each of the outer chip removal surfaces 130 is inclined towards the second connecting end 112 from the first connecting end 111. In other words, each of the outer chip removal surfaces 130 is inclined in the direction from one of the adjacent slots 15 towards the other of which. Wherein, a width of the first ring portion 11 gradually decreases from the first connecting end 111 to the second connecting end 112. On the other hand, the slots 15 separate the inner surface 14 into a plurality of inner chip removal surfaces 140, thereby each of the inner chip removal surfaces 140 is between each pair of the neighboring slots 15; in other words, each of the slots 15 is between each pair of the neighboring inner chip removal surfaces 140. In an alternate preferred embodiment, each of the inner chip removal surfaces is inclined in the direction from one of the two adjacent slots towards the other of which, thereby at least two of the inner chip removal surfaces are non-coplanar.

The driving shaft 20 is fixed to the main body 10, having a first end 21 and a second end 22 on the opposite ends thereof. In the present embodiment, the driving shaft 20 passes through the embedded hole 121 with the first end 21 extending out of the main body 10 via the second ring portion 12 and the second end 22 hidden in the main body 10. In another words, the second end 22 is not beyond the first ring portion 11.

The milling members 30 are mounted on the mounting portions of the main body 10 individually and surround the main body 10 in a radial manner. In particular, the milling members 30 are embedded in the slots 15 respectively. Each of the milling members 30 has a first blade 31 and a second blade 32 on opposite sides in a width direction, thereby the first blade 31 protrudes from the outer surface 13 of the main body 10 and the second blade 32 protrudes from the inner surface 14 of the main body 10 when the milling member 30 is mounted in the slot 15. Each of the milling members 30 further has a first connecting groove 33 and a peak 34, while the first connecting groove 33 is located on an end of the milling member 30 and the peak 34 is located on an end of which opposite to the first connecting groove 33. The first connecting grooves 33 corresponds to the edge portions 110 of the first ring portion 11, and each of the first connecting grooves 33 further has a notch 330 on a sidewall thereof in a depth direction (where "depth direction" is defined as the direction towards the bottom sidewall of the first connecting groove 33). In the present preferred embodiment, the notches 33 are circle holes. When the milling members 30 are received in the slots 15, the edge portions 110 enter the notches 330 along the first connecting grooves 33 without contacting the inner surfaces of the notches 330. On the other hand, when the milling members 30 are about to leave the slots 15, the notches 330 provide a moving space for the edge portion 110, allowing them to slide relative to the moving space within the notches 330 without getting stuck on the milling members 30. The peaks 34 are horn-like member which corresponds to the shape of the recesses 120 of the second ring portion 12. Each of the peaks 34 has a second connecting groove 340 corresponding to the second ring portion 12. Thereby, when the milling members 30 are received in the slots 15, the peaks 34 of the milling members 30 can be received in the recesses 120, and the groove surfaces of the second connecting grooves 340 connected to the outer circumferential surface of the second ring portion 12.

The fixing assembly 40 has a shaft fixing member 41 and a fixing member. The shaft fixing member 41 has, along a length direction thereof, a head portion 410, an engaging portion 411 and a thread portion 412 in sequence. The head portion 410 is radially penetrated by a screw hole 413, through which at least one screw (not shown) is inserted to secure the driving shaft 20. A shape of the engaging portion 411 corresponds to that of the embedded hole 121 of the main body 10. The thread portion 412 has an external thread in its outer periphery, and the axial interior of the threaded portion 412 is penetrated by a shaft hole 414. The shaft fixing member 41 passes through the embedded hole 121 of the main body 10, while the thread portion 412 extends from the outer surface 13 and the head portion 410 extends from the inner surface 14. The engaging portion 411 is engaged in the embedded hole 121, preventing the shaft fixing member 41 from rotating relative to the main body 10, and the driving shaft 20 passes through the shaft hole 414 of the shaft fixing member 41. In the present preferred embodiment, the driving shaft 20 is a hexagonal pillar, and the shaft hole 414 is a hexagonal hole. In an alternate preferred embodiment, the shaft hole can be any shape corresponding to that of the driving shaft. Due to the corresponding shape between the shaft hole 414 and the driving shaft 20, the driving shaft 20 is unable to rotate relative to the shaft fixing member 41. In the present preferred embodiment, the fixing member includes a washer 42 and a nut 43. While in an alternate preferred embodiment, the washer and the nut can be combined into one component. The washer 42 engages the thread portion 412 and rests against the second ring portion 12 and the second connecting grooves 340 of the milling member 30, surrounding the peaks 34 to secure the milling members 30 to the main body 10. The nut 43 has an internal thread, which corresponds to the external thread of the thread portion 412. Thereby, the nut 43 screws into the thread portion 412 of the shaft fixing member 41 and secure the washer 42 to the main body 10.

Figure 7:
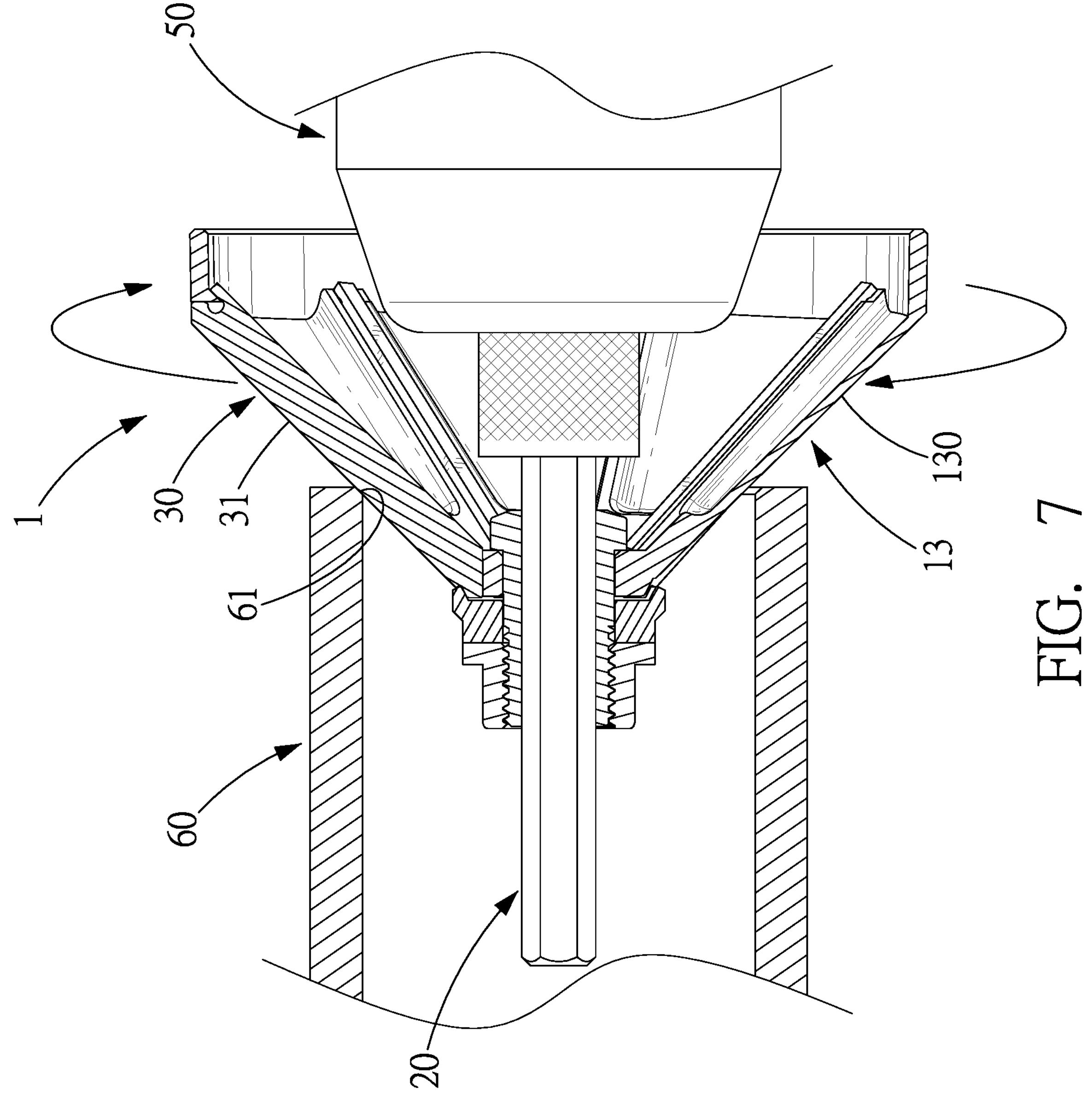
FIG. 7 is a schematic view of the preferred embodiment of the present invention, showing how the chamfer tool chamfers the internal end of the tube.
Figure 8:
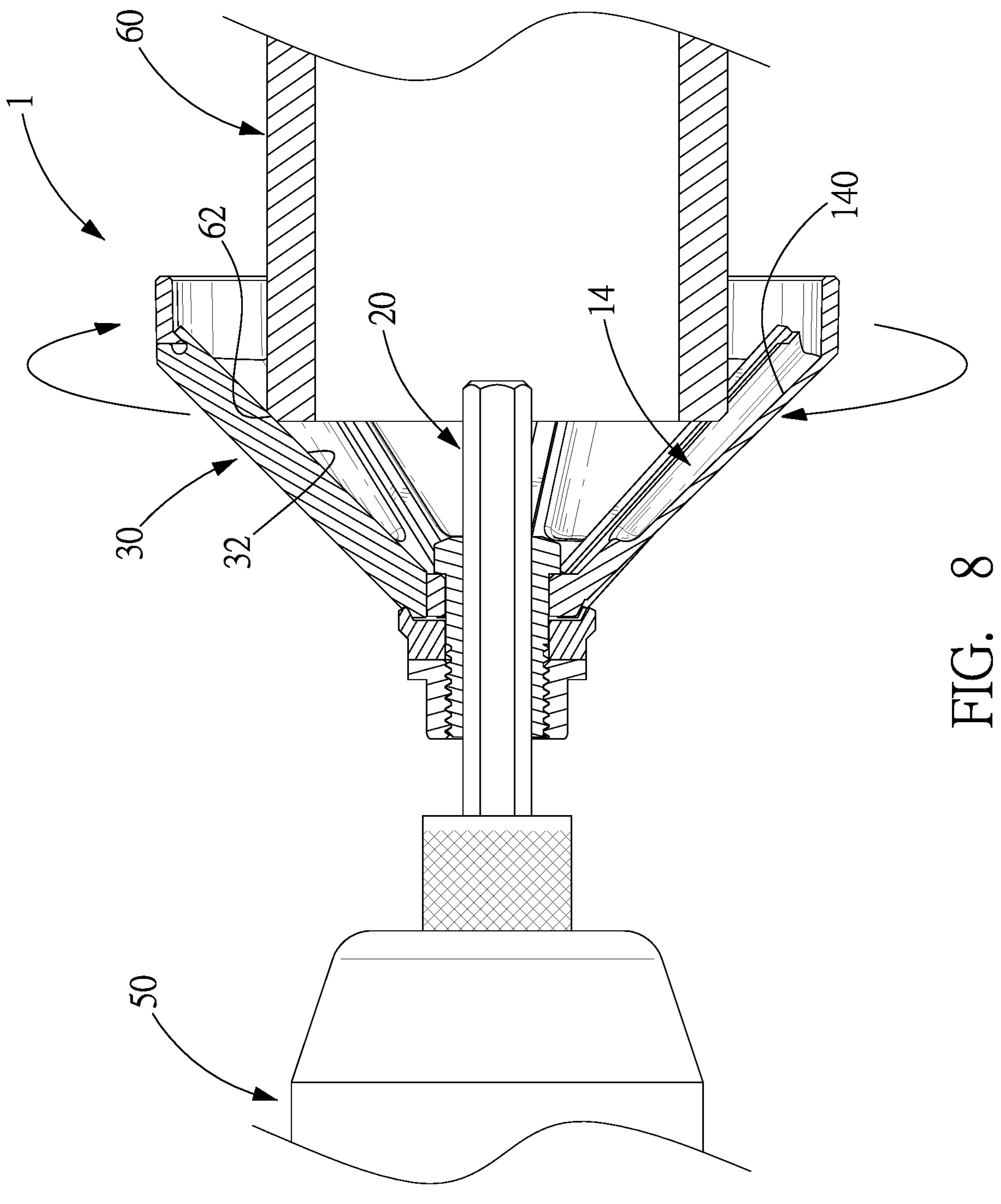
FIG. 8 is a schematic view of the preferred embodiment of the present invention, showing how the chamfer tool chamfers the external end of the tube.

The chamfer tool 1 of the preferred embodiment of the present invention is able to work between an internal chamfering operation (FIG. 7) and an external chamfering operation (FIG. 8).

As shown in FIG. 7, in the internal chamfering operation, a driving tool 50 is connected to the second end 22 (not shown) of the driving shaft 20, allowing the chamfer tool 1 to be positioned with the outer surface 13 facing outward (where “outward” is defined as the side away from the driving tool 50). Thus, an internal end 61 of a tube 60 can rest against the first blades 31 of the milling members 30. When the driving tool 50 is activated, the driving shaft 20 is driven to rotate, thereby causing the main body 10 to rotate synchronously. In this status, the first blades 31 of the milling members 30 start milling the internal end 61 of the tube 60, in order to remove the burrs on the internal end 61 of the tube 60, and thus create an inner chamfer on the internal end 61 of the tube 60. At the same time, chips generated during the chamfering process can also be removed from the non-coplanar outer chip removal surfaces 130 on the outer surface 13, preventing the chips from getting stuck on the outer surface 13 and causing damage to the milling members 30.

As shown in FIG. 8, in the external chamfering operation, the driving tool 50 is connected to the first end 21 (not shown) of the driving shaft 20, allowing the chamfer tool 1 to be positioned with the inner surface 14 facing outward. Thus, an external end 62 of the tube 60 can rest against the second blades 32 of the milling members 30. When the driving tool 50 is activated, the driving shaft 20 is driven to rotate, thereby causing the main body 10 to rotate synchronously. In this status, the second blades 32 of the milling members 30 start milling the external end 62 of the tube 60, in order to remove the burrs on the external end 62 of the tube 60, and thus create an outer chamfer on the external end 62 of the tube 60.

It should be noted that the non-coplanar chip removal surface structure of the present preferred embodiment can not only be used in the chamfer tool 1, but also in conventional external chamfer tools or internal chamfer tools In conclusion, the chamfer tool 1 of the preferred embodiment provides the first blades 31 and the second blades 32 extending from both the outer surface 13 and the inner surface 14, allowing the chamfer tool 1 to work between the internal chamfering operation and the external chamfering operation. Since conventional chamfer tools presented in the market could only perform chamfering operations on either the inner end or the outer end of a tube, which needs to prepare more than one chamfer tool in a process, the present invention can reduce the number of tool be needed, enhance the convenience of chamfering operation. On the other hand, the non-coplanar design of the chip removal surfaces also preventing the chips from getting stuck on the chamfer tool 1, which improves the chip removal efficiency during chamfering operation.

It must be pointed out that the embodiments described above are only some preferred embodiments of the present invention. All equivalent structures which employ the concepts disclosed in this specification and the appended claims should fall within the scope of the present invention.

What is claimed is:

1. A chamfer tool, comprising:

a main body, which rotates along an axis, having an inner surface and an outer surface located on opposite sides thereof; wherein the main body further has a plurality of mounting portions, each of which is connected to the inner surface and outer surface;

a driving shaft fixed to the main body to drive the main body to rotate; and a plurality of milling members each having a first blade and a second blade, wherein the milling members are mounted on the mounting portions of the main body with the first blades protruding from the outer surface of the main body and the second blades protruding from the inner surface of the main body;

wherein the main body has a plurality of edge portions adjacent to ends of the mounting portions individually; each of the milling members has a first connecting groove corresponding to the edge portions respectively, and each of the first connecting groove further has a notch on a sidewall thereof; the edge portions enter the notches along the first connecting grooves without contacting the inner surfaces of the notches when the milling members is mounted on the mounting portions.

2. The chamfer tool of claim 1, further comprising a fixing member detachably connected to the main body and resting against at least one of the milling members to secure the milling members to the main body.

3. The chamfer tool of claim 2, wherein each of the milling members has a peak and a second connecting groove adjacent to the peak, allowing an end of the fixing member resting against the second connecting grooves of the milling member and surrounding the peaks when the fixing member is secured to the main body.

4. The chamfer tool of claim 1, further comprising a shaft fixing member mounted on the main body, wherein the shaft fixing member having a non-circular shaft hole for the driving shaft to pass through; a shape of the shaft hole corresponds to that of the driving shaft to prevent the driving shaft from rotating relative to the shaft fixing member.

5. The chamfer tool of claim 1, wherein a plurality of chip removal surfaces are formed between each of the neighboring mounting portions respectively, and at least two of the chip removal surfaces are non-coplanar.

6. A chamfer tool, comprising:

a main body, which rotates along an axis, having mounting portions, wherein a chip removal surface is formed between two of the neighboring mounting portions;

a driving shaft fixed to the main body to drive the main body to rotate; and a plurality of milling members mounted on the mounting portions of the main body, wherein each of the milling members has an end protruding from the main body;

wherein the chip removal surface is inclined from one of the mounting portions towards the other;

wherein the main body has a plurality of edge portions adjacent to ends of the mounting portions individually; each of the milling members has a first connecting groove in an end corresponding to the edge portions respectively, and each of the first connecting groove further has a notch; the edge portions enter the notches along the first connecting grooves without contacting the inner surfaces of the notches when the milling members is mounted on the mounting portions.

7. The chamfer tool of claim 6, further comprising a fixing member detachably connected to the main body, wherein each of the milling members has a peak and a second connecting groove adjacent to the peak; thereby when the fixing member is secured to the main body, ends of the fixing members rest against the corresponding second connecting grooves of the milling members and surround the peaks to secure the milling members to the main body.

8. The chamfer tool of claim 6, further comprising a shaft fixing member mounted on the main body, wherein the shaft fixing member has a non-circular shaft hole for the driving shaft to pass through; a shape of the shaft hole corresponds to that of the driving shaft to prevent the driving shaft from rotating relative to the shaft fixing member.

* * * * *